United States Patent

[11] 3,584,700

| [72] | Inventor | Peter L. Jurisich<br>5225 Bindewald Road, Torrance, Calif. |
|---|---|---|
| [21] | Appl. No. | 832,006 |
| [22] | Filed | June 10, 1969 |
| [45] | Patented | June 15, 1971 |

[54] SOUND ABSORBING HONEYCOMB PANEL
9 Claims, No Drawings

| [52] | U.S. Cl. | 181/33 |
|---|---|---|
| [51] | Int. Cl. | E04b 1/86 |
| [50] | Field of Search | 181/33, 33.1, 33.11, 33.12, 30 |

[56] References Cited

UNITED STATES PATENTS

| 2,076,807 | 4/1937 | Burgess | 181/33(.1) |
|---|---|---|---|
| 3,074,505 | 1/1963 | Schulz | 181/33(.1) |
| 3,351,154 | 11/1967 | Kodaras | 181/33(.1) |
| 3,433,322 | 3/1969 | Olsson | 181/33(.1) |

FOREIGN PATENTS

| 822,307 | 9/1937 | France | 181/33(.1) |
|---|---|---|---|

*Primary Examiner*—Robert S. Ward, Jr.
*Attorney*—George F. Bethel

ABSTRACT: An improved laminate having a sound absorbing honeycomb core, and process therefor comprising, a honeycomb-spaced core with sound absorbing material in the spaces such as fibrous glass or cellular foam and wherein the edge regions of the walls of the honeycomb core at either major surface are turned to provide a flange for the maintenance of sound absorbing material within the spaces, and additionally a broader surface area to contact materials thereon.

SOUND ABSORBING HONEYCOMB PANEL

BACKGROUND OF THE INVENTION

This invention lies within the art of laminating sound absorbing honeycomb panels.

Sound absorbing honeycomb cored panels of the prior art often utilize thin-walled honeycomb cores sandwiched between two layers of sound penetrable material. The honeycomb core walls are usually formed of a stiffened fibrous material, or a thin metal. The honeycomb core is often provided with fibrous glass or other cellular sound absorbing material in the spaces of the core. When fibrous glass is used within the walls of the honeycomb core for sound absorbency, the fibrous glass is installed by being pushed down over the relatively sharp edges of the honeycomb structure, thereby being cut, and providing discretely sized portions in each respective space between the walls of the honeycomb core.

The foregoing spaces of the honeycomb cores with a sound absorbing material therein are usually covered with a thin sound penetrable fabric or sheet. Such fabrics or sheets have been as porous as small mesh insect screening. However, some sheets are not porous and rely upon a drumhead action to vibrate freely and pass sound energy into the sound absorbing medium. A significant drawback in applying the sound penetrable fabric or sheet has been that the exposed edges of the honeycomb core are not of sufficient area to properly connect the sound penetrable sheet or fabric when an adhesive is used. Therefore, in order to facilitate adhesion of the sheets, large areas have been coated with a resin including the exposed surfaces of the sound absorbing material. This creates a substantial drawback for the absorbency of sound, inasmuch as the sound cannot as easily penetrate the resin which is on the sound absorbing material and the sound penetrable sheet. Furthermore, in the case of vibratorily responding thin nonporous sheets, the sheets are substantially prevented from properly vibrating.

A further drawback of the prior art is that when a sound penetrable sheet or fabric is placed in contact with the honeycomb core it tends to delaminate more easily. Furthermore, the exposed sharp edges of the walls of the core tend to cut the sound penetrable sheets.

The instant invention overcomes the deficiencies of the prior art by providing a partial mechanical covering of the sound absorbing material in the honeycomb core. Additionally, the invention provides an improved and larger surface area for attachment of the sound penetrable fabric or sheet thereby decreasing the chances of delamination or cutting thereof.

DESCRIPTION OF THE PREFERRED EMBODIMENTS

To provide the improved panel of this invention, the following method and resulting laminate is utilized.

A honeycomb core made from a stiff walled material such as aluminum or fibrous impregnated wood fibers is provided. The honeycomb core has a major upper and lower face, generally with spaces therethrough having a longitudinal relationship which is usually at an angle to the major faces of the structure. The spaces of the honeycomb core are provided with a sound absorbing material such as a fibrous glass, rock wool, or cellular foamed plastic.

The fibrous sound absorbing materials can be impressed within the spaces of the honeycomb core by forcing the fibrous material at the major surfaces of the structure against the relatively sharp edges of the walls of the honeycomb core. In this manner, the fibrous glass is forced into the spaces of the honeycomb structure in discrete amounts generally filling each of the entire spaces of the core. In addition to the foregoing method, foamed plastic materials can be poured into the spaces between the walls of the honeycomb core.

After the honeycomb core has been filled with the sound absorbing material, the entire foregoing structure is placed within a press. A heat press is particularly advantageous when aluminum honeycomb core is used because of the relatively low softening temperature of aluminum. The press should be provided with platens which are relatively of the same surface configuration as the major faces of the honeycomb structure. The press is then lowered to squeeze the entire structure at its major faces in a manner such that the edges are turned over the sound absorbing material in the spaces of the honeycomb core, thereby providing a flange thereover. A suitable flange over the sound absorbing material for a honeycomb core having a thickness of anywhere from one-half inch upward has been found to be a 1/16-inch flange.

The flange can be provided by rolling the panel through two spaced rollers or surfaces which are less than the thickness of the honeycomb core. Such a method provides a crimping action on the wall edges of the honeycomb core at the major surfaces thereof, thereby partially encapsulating the sound absorbing materials in the core spaces.

After the foregoing crimping, or overturning of the edges of the walls of the honeycomb structure, an adhesive is applied to the exposed surfaces of the flanges or overturned portions of the core walls at the major faces of the honeycomb core. A sound penetrable fabric or material is rolled in place or adhered in any suitable manner to the flanged or overturned core walls at the faces of the honeycomb core. The foregoing allows a substantial portion of the surface area on either major surface of the honeycomb laminate to receive sounds impinged thereupon, and be absorbed through the openings provided which are clear of any sound inhibiting adhesive.

It can be seen from the foregoing disclosure that this invention is a substantial step forward in the state of the art of sound absorbing honeycomb cored laminates. The invention provides an improved bonding of the surface fabrics or facings to the interiorally sandwiched honeycomb core. More importantly, the openings to the sound absorbing material are greatly cleared of any sound inhibiting adhesive. Thus, sound can penetrate the sound penetrable facings and be absorbed in the sound absorbing material within the spaces of the honeycomb core.

It should be pointed out that in some cases thin nonporous sheets are used as sound penetrable sheets. The sheets act as a drumhead vibrating and transmitting energy into the core. Thus, this invention helps to free the sheets enabling them to vibrate freely and pass the absorbed sound into the sound absorbing material in the spaces.

The foregoing invention provides a practical and advanced method, and laminated panel for absorbing sound. Thus, the invention is a substantial step forward in the state of the art, and the scope and spirit thereof should only be read in light of the following claims.

I claim:

1. An improved sound absorbing panel having a core with spaces therein comprising:
    a core structure having walled spaces open to a major face of said core;
    a sound absorbing material filling at least a portion of said spaces; and,
    at least a portion of the walls of said core at the major faces thereof overturned in part from the longitudinal relationship of said wall to maintain said sound absorbing material within the spaces.

2. The panel as claimed in claim 1 further comprising:
    a sound penetrable sheet on at least one major face of the foregoing filled core.

3. The sound absorbing panel as claimed in claim 1 further comprising:
    a sound penetrable sheet on either side of said core and adhered to at least a portion of the exposed overturned edges of said walls thereof for the sandwiching of the core therebetween.

4. The panel as claimed in claim 2 wherein:
    the sound penetrable sheet comprises a sound permeable fabric.

5. The panel as claimed in claim 2 wherein:

said sound absorbing material is comprised of a fibrous substance.

6. The method for manufacturing an improved sound absorbing laminate comprising:
providing a core having walled spaces open to a major face thereof;
placing a sound absorbing material at least partially between said walls;
overturning a portion of the edges of the walls of said walled spaces at a major face of said core for maintaining said sound absorbing material within the spaces thereof.

7. The method as claimed in claim 6 further comprising:
pouring a cellular sound absorbing material into the spaces between the walls of said core.

8. The method as claimed in claim 6 further comprising:
placing an adhesive on at least a portion of the exposed overturned edges lying at the major faces of said core;
adhering a sound permeable sheet across a major face of said core to at least a portion of the overturned edges of said walls of said core.

9. The method as claimed in claim 6 further comprising:
placing an adhesive on at least a portion of the overturned walls of said core;
sandwiching said core between a sound penetrable sheet on each major face of said core; and,
curing the adhesive for bonding said sheets to said core.